US012779382B2

(12) United States Patent
Kigami et al.

(10) Patent No.: US 12,779,382 B2
(45) Date of Patent: Nov. 3, 2026

(54) STRETCHED POROUS POLYTETRAFLUOROETHYLENE MEMBRANE, AIR-PERMEABLE MEDIUM USING THE SAME, AND FILTER MEMBER USING THE SAME

(71) Applicant: NITTO DENKO CORPORATION, Osaka (JP)

(72) Inventors: Hiroki Kigami, Osaka (JP); Yuichi Takamura, Osaka (JP); Eisuke Kurogi, Osaka (JP); Kodai Ueda, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 787 days.

(21) Appl. No.: 17/781,913

(22) PCT Filed: Dec. 3, 2020

(86) PCT No.: PCT/JP2020/045119
§ 371 (c)(1),
(2) Date: Jun. 2, 2022

(87) PCT Pub. No.: WO2021/112198
PCT Pub. Date: Jun. 10, 2021

(65) Prior Publication Data

US 2023/0019449 A1 Jan. 19, 2023

(30) Foreign Application Priority Data

Dec. 5, 2019 (JP) ................................ 2019-220672

(51) Int. Cl.
*B01D 39/16* (2006.01)
*B01D 67/00* (2006.01)
(Continued)

(52) U.S. Cl.
CPC ..... *B01D 39/1692* (2013.01); *B01D 67/0027* (2013.01); *B01D 69/02* (2013.01);
(Continued)

(58) Field of Classification Search
CPC ....................... B01D 39/1692; B01D 67/0027; B01D 69/02; B01D 69/06; B01D 69/1213;
(Continued)

(56) References Cited

U.S. PATENT DOCUMENTS 3,953,566 A * 4/1976 Gore ..................... H01B 3/445 264/289.3
4,187,390 A * 2/1980 Gore ......................... B32B 5/32 428/323
(Continued)

FOREIGN PATENT DOCUMENTS

CN 102196894 9/2011
CN 109012233 A * 12/2018 ........... B01D 46/543
(Continued)

OTHER PUBLICATIONS

China Office Action received in CN Application No. 202080084023.9, dated Mar. 4, 2023.
(Continued)

*Primary Examiner* — Minh Chau T Pham
(74) *Attorney, Agent, or Firm* — GREENBLUM & BERNSTEIN, P.L.C.

(57) ABSTRACT

A provided stretched porous polytetrafluoroethylene membrane has a node-fibril structure including a plurality of nodes and a fibril connecting the plurality of nodes. A ratio of an average length of the plurality of nodes in a thickness direction of the stretched porous polytetrafluoroethylene membrane to a thickness of the stretched porous polytetrafluoroethylene membrane is 10% or more. The above stretched porous polytetrafluoroethylene membrane is less
(Continued)

Example 1 likely to suffer breakage. In the above stretched porous polytetrafluoroethylene membrane, assuming that there is a cuboid region having an upper surface and a lower surface respectively positioned at one membrane surface and the other membrane surface of the stretched porous polytetrafluoroethylene membrane, the number of the nodes included in the region may be 4 or less per micrometer thickness, the upper surface and the lower surface each having dimensions of 280 μm×280 μm.

10 Claims, 10 Drawing Sheets

(51) Int. Cl.
*B01D 69/02* (2006.01)
*B01D 69/06* (2006.01)
*B01D 69/12* (2006.01)
*B01D 71/36* (2006.01)

(52) U.S. Cl.
CPC ......... *B01D 69/06* (2013.01); *B01D 69/1213* (2022.08); *B01D 71/36* (2013.01); *B01D 2239/1208* (2013.01); *B01D 2239/1258* (2013.01); *B01D 2239/1291* (2013.01); *B01D 2323/081* (2022.08); *B01D 2325/0281* (2022.08); *B01D 2325/04* (2013.01); *B01D 2325/20* (2013.01); *B01D 2325/24* (2013.01)

(58) Field of Classification Search
CPC ............ B01D 71/36; B01D 2239/0681; B01D 2239/1208; B01D 2239/1258; B01D 2239/1291; B01D 2325/02; B01D 2325/0281; B01D 2325/20; B01D 2325/24; C08J 2327/18
USPC ............. 55/486, 385.1, 522–529; 264/289.3; 428/36.1, 317.9, 323
See application file for complete search history.

(56) References Cited

U.S. PATENT DOCUMENTS 4,482,516 A 11/1984 Bowman et al.
4,576,861 A * 3/1986 Kato ........................ B32B 27/08 428/317.9
4,598,011 A * 7/1986 Bowman ............... B29C 55/005 428/221
4,976,550 A * 12/1990 Shobert ................. F16C 33/201 384/298
2005/0186367 A1 8/2005 Hanrahan
2006/0047311 A1* 3/2006 Lutz ........................ A01K 91/00 606/228
2009/0277141 A1 11/2009 Abe et al.
2010/0159171 A1* 6/2010 Clough .................. D04B 21/12 428/36.1
2011/0192283 A1 8/2011 Shimatani et al.
2014/0099461 A1 4/2014 Swanick
2020/0172695 A1 6/2020 Park et al.
2020/0384424 A1* 12/2020 Inoue ......................... C08J 9/00
2023/0025947 A1* 1/2023 Takamura .............. B01D 69/02

FOREIGN PATENT DOCUMENTS

CN 116870716 A * 10/2023 ............. B01D 69/02
DE 112020005959 * 9/2022 ........... B01D 46/543
JP 59-145124 8/1984
JP 11-80397 3/1999
JP H1180397 A * 3/1999 ................ C08J 5/18
JP 11-515036 12/1999
JP 2007-523247 8/2007
JP 2009-24040 2/2009
JP 2009-297702 12/2009
WO 97/06206 2/1997
WO WO 9706206 A1 * 2/1997 ............. B01D 71/36
WO 2005/083281 9/2005
WO 2018/221688 12/2018
WO WO-2018221688 A1 * 12/2018 ................ C08J 9/00
WO 2019/083140 5/2019

OTHER PUBLICATIONS

Official Communication issued in International Bureau of WIPO Patent Application No. PCT/JP2020/045119, dated Feb. 9, 2021, along with an English translation thereof.
Japan, Notice of Reasons for Refusal issued in Japanese Patent Application No. 2021-562732, dated Sep. 24, 2024.
ADM ET, "Peel-strength-testing", "https://-.admet.com/blog/peel-strength-testing/#: :text=peel%zostrength%zc%zothe%zoaverage%zoforce,biomaterials%zc%zomicroelectronics%zc%zoand%zomore." 10 pages, 1994 (Year: 1994).
China Office Action received in CN. Application No. 202080084042.1, dated Oct. 31, 2023, and English language translation thereof.
Japan, Notice of Reasons for Refusal received in JP2021-562731, dated Sep. 24, 2024, and English language translation thereof.
International Search Report received in International Patent Application No. PCT/JP2020/045118, dated Feb. 9, 2021, along with an English translation thereof.
Korean Office Action received in Application No. 10-2022-7018245, dated Nov. 24, 2025, and English language translation thereof.

* cited by examiner

Example 1

Example 1

Example 2

Example 2

Example 3

Example 3

Example 4

Example 4

Comparative Example 1

Comparative Example 1

Comparative Example 2

Comparative Example 2

STRETCHED POROUS POLYTETRAFLUOROETHYLENE MEMBRANE, AIR-PERMEABLE MEDIUM USING THE SAME, AND FILTER MEMBER USING THE SAME

TECHNICAL FIELD

The present invention relates to a stretched porous polytetrafluoroethylene (hereinafter referred to as "PTFE") membrane, an air-permeable medium using the stretched porous PTFE membrane, and a filter member using the stretched porous PTFE membrane.

BACKGROUND ART

A filter member including an air-permeable medium may be attached to a housing of a variety of electrical appliances, such as automotive electrical components and mobile terminal devices, such that the filter member covers an opening provided for the housing. The air-permeable medium has air permeability in a thickness direction thereof and prevents foreign matters, such as dust and water, from passing therethrough. Attachment of the filter member can ensure ventilation through the opening while preventing foreign matters from passing through the opening. It is conceivable to use a stretched porous PTFE membrane as the air-permeable medium.

Patent Literature 1 discloses a highly-air-permeable stretched porous PTFE membrane. Patent Literature 2 discloses a highly-air-permeable stretched porous PTFE membrane having a high ball-burst strength.

CITATION LIST

Patent Literature

Patent Literature 1: JP 2009-297702 A
Patent Literature 2: JP H11-515036 A

SUMMARY OF INVENTION

Technical Problem

For example, highly-air-permeable stretched porous PTFE membranes can improve the air permeability of filter members, and improvement in air permeability of filter members can facilitate downsizing of the members. However, according to studies by the present inventors, when a highly-air-permeable stretched porous PTFE membrane is included in a filter member, the stretched porous PTFE membrane is likely to suffer breakage such as cracking at the time of handling the member or placing the member on a housing or the like. A property of being less likely to suffer breakage is also required of stretched porous PTFE membranes not having a high air permeability.

The present invention aims to provide a stretched porous PTFE membrane being less likely to suffer breakage.

Solution to Problem

The present invention provides a stretched porous PTFE membrane, the stretched porous PTFE membrane having a node-fibril structure including a plurality of nodes and a fibril connecting the plurality of nodes, wherein a ratio of an average length of the plurality of nodes in a thickness direction of the stretched porous PTFE membrane to a thickness of the stretched porous PTFE membrane is 10% or more.

In another aspect, the present invention provides an air-permeable medium, the air-permeable medium having air permeability in a thickness direction of the air-permeable medium, preventing a foreign matter from passing therethrough in the thickness direction, and including the above stretched porous PTFE membrane of the present invention.

In still another aspect, the present invention provides a filter member, the filter member including an air-permeable medium having air permeability in a thickness direction of the air-permeable medium and preventing a foreign matter from passing therethrough in the thickness direction, wherein the air-permeable medium is the above air-permeable medium of the present invention.

Advantageous Effects of Invention

According to the present invention, a stretched porous PTFE membrane being less likely to suffer breakage is achieved.

DESCRIPTION OF EMBODIMENTS

Figure 1:
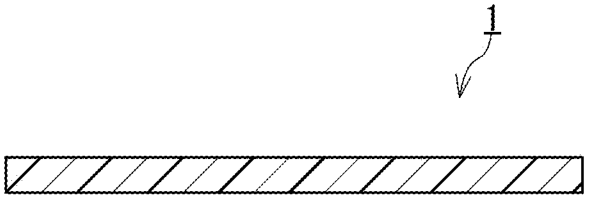
FIG. 1 is a cross-sectional view schematically showing an example of a stretched porous PTFE membrane of the present invention.
Figure 2:
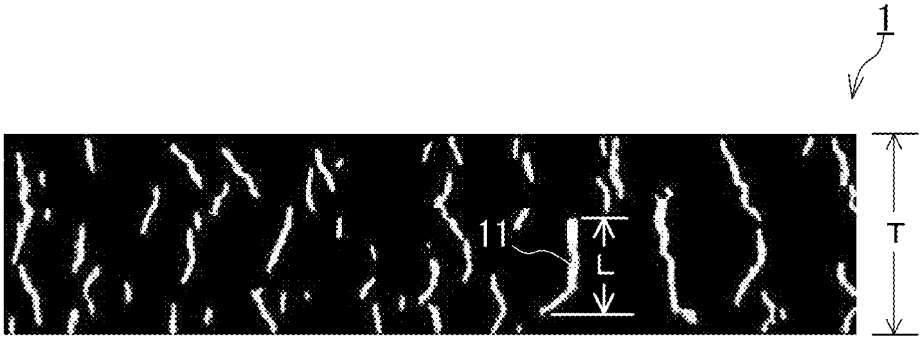
FIG. 2 is an enlarged view showing a cross-section of the stretched porous PTFE membrane of FIG. 1.

FIG. 1 shows an example of a stretched porous PTFE membrane of the present invention. A stretched porous PTFE membrane 1 of FIG. 1 has a node-fibril structure including a plurality of nodes and a fibril connecting the plurality of nodes. The node is an aggregate of PTFE. The stretched porous PTFE membrane 1 is generally formed by stretching a PTFE sheet. A portion turned into a fine fibril (fibrillated) by the stretching in the formation method corresponds to the fibril. On the other hand, a portion not fibrillated and keeping an aggregation state of PTFE corresponds to the node. Generally, a plurality of fibrils are connected to one node. As shown in FIG. 2, in the stretched porous PTFE membrane 1, a ratio R (=$L_M$/T) of an average length $L_M$ of a plurality of nodes 11 in a thickness direction of the stretched porous membrane 1 (an average of lengths L of the plurality of nodes 11 in the thickness direction of the stretched porous membrane 1) to a thickness T of the stretched porous membrane 1 is 10% or more. FIG. 2 shows an enlarged view (illustration of the fibrils is omitted) of a cross-section of the stretched porous PTFE membrane 1. The ratio R may be 12% or more, 14% or more, 15% or more, 16% or more, or even 18% or more. A large ratio R indicates that each node 11 is long in the thickness direction of the stretched porous PTFE membrane 1. According to studies by the present inventors, for example, breakage of the stretched porous PTFE membrane 1 that can occur at the time of handling a filter member, placing a filter member on a housing, and the like is attributed to failure (cohesive failure) caused by application of a force exceeding cohesion of the membrane 1 to the membrane 1. The node 11 that is long in the thickness direction can improve the cohesion of the stretched porous PTFE membrane 1 to reduce cohesive failure. Therefore, the stretched porous PTFE membrane 1 is less likely to suffer breakage.

The stretched porous PTFE membrane 1 can have a more characteristic node-fibril structure. Assuming that there is a cuboid region having an upper surface and a lower surface respectively positioned at one membrane surface and the other membrane surface of the stretched porous PTFE membrane 1, the number N of the nodes 11 included in the region is, for example, 4 or less per micrometer thickness, the upper surface and the lower surface each having dimensions of 280 μm×280 μm. The number N may be 3 or less, 2 or less, 1.5 or less, 1.3 or less, 1.2 or less, 1.1 or less, 1.0 or less, or even 0.9 or less. The lower limit of the number N is, for example, 0.3 or more. Conventional stretched porous PTFE membranes cannot achieve the ratio R and the number N in the above ranges because the degree to which a node is divided in the thickness direction is high.

Figure 3A:
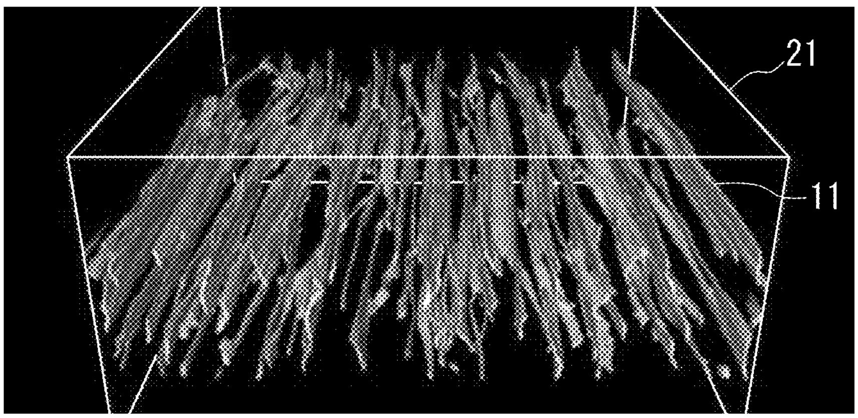
FIG. 3A illustrates a method for evaluating a structure of a stretched porous PTFE membrane by X-ray CT.
Figure 3B:
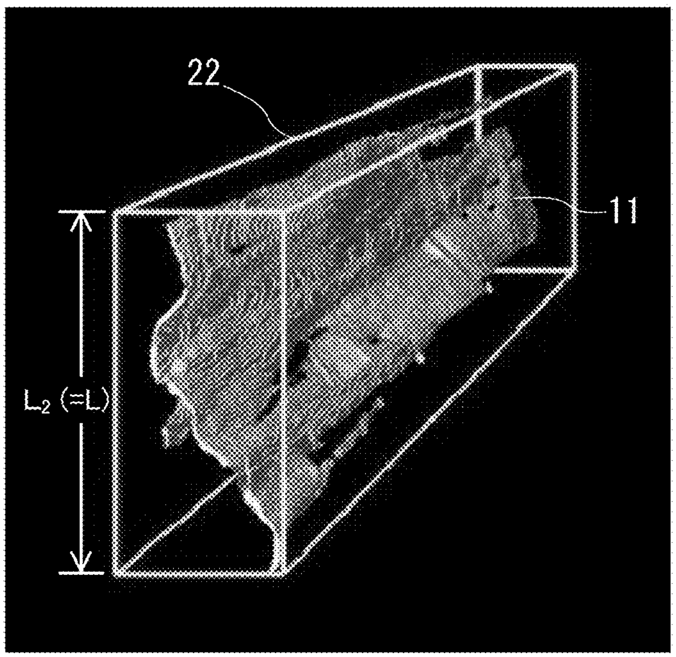
FIG. 3B illustrates a method for evaluating a structure of a stretched porous PTFE membrane by X-ray CT.

The length L of the node 11 in the thickness direction, the average length $L_M$ being the average of the lengths L, and the number N of the nodes 11 can be evaluated, for example, by three-dimensional image structural analysis of the stretched porous PTFE membrane 1 using an X-ray CT scanner (refer to FIGS. 3A and 3B). First, a cuboid evaluation region 21 having dimensions of 280 μm×280 μm in directions parallel to the membrane surfaces of the stretched porous PTFE membrane 1 and including the whole thickness of the stretched porous PTFE membrane 1 in a thickness direction of the region 21 is defined in the membrane 1. The thickness of the evaluation region 21 may be greater than the thickness of the stretched porous PTFE membrane 1 (refer to FIG. 3A); however, the thickness of the evaluation region 21 is preferably about equal to or less than 5 times the thickness of the stretched porous PTFE membrane 1 for a high resolution of a three-dimensional image to be constructed. In the case where the stretched porous PTFE membrane 1 is laminated on an air-permeable supporting member such as a non-woven fabric, the evaluation region 21 is defined such that the evaluation region 21 does not include the air-permeable supporting member. Next, serial transmission images are taken while the slicing position is being rotated at given intervals. For example, when the MD direction of the membrane 1 is defined as an X direction, the TD direction of the membrane 1 is defined as a Y direction, and the thickness direction of the membrane 1 is defined as a Z direction, the rotation is performed around a rotation axis extending in the Z direction through the center of a principal surface of the membrane 1. The number of serial transmission images taken is preferably 300 or more, more preferably 500 or more, even more preferably 700 or more, and particularly preferably 800 or more. Then, a three-dimensional image of the evaluation region 21 is constructed using the obtained serial transmission images. Software provided with the X-ray CT scanner can be used to construct the three-dimensional image. After that, the nodes 11 are extracted from the constructed three-dimensional image using image analysis software (refer to FIG. 3A). The node 11 can be extracted by binarization of a gap in the stretched porous PTFE membrane 1 and the rest (typically, the node 11 and the fibril) of the membrane 1 and separation of the node 11 and the fibril after the binarization. The binarization is preferably performed by Li's method (refer to C. H. Li and C. K. Lee, Minimum cross entropy thresholding, Pattern Recognition, vol. 26, No. 4, pp. 617-625, 1993). The node 11 and the fibril can generally be separated according to their diameters. The diameter of the node 11 is, for example, 1 μm or more, and may be 1.5 μm or more, 2 μm or more, or 3 μm or more. The diameter of the fibril is, for example, less than 1 μm, and may be 0.8 μm or less, 0.5 μm or less, or 0.1 μm or less. The term "diameter" as used in the present specification can be defined by the length of the shortest line segment of imaginary line segments that are present only within a three-dimensional object and that pass the center of gravity of the object. Alternatively, in a simpler method, the node 11 and the fibril can be separated, for example, according to the volume of a PTFE body shown in the three-dimensional image constructed by X-ray CT. For example, when a resolving power (resolution) of X-ray CT is 0.35 μm/pixel, a PTFE body having a volume of 500 voxels (21.44 $\mu m^3$) or less may be assumed to be a fibril and a PTFE body having a volume greater than 500 voxels (21.44 $\mu m^3$) may be assumed to be a node. The image analysis software is, for example, ImageJ which is free software developed by the National Institutes of Health of the US. ImageJ can perform binarization by Li's method. ImageJ can separate the node 11 and the fibril by adjustment of a threshold of a denoising command. The number N can be determined by dividing the number of the extracted nodes 11 by the thickness of the stretched porous PTFE membrane 1 (unit: ρm). Next, using the image analysis software, it is assumed that there is a cuboid 22 (its planes are parallel to an X-Y plane, an X-Z plane, and a Y-Z plane) circumscribed around each of the extracted nodes 11. A length $L_2$ of the cuboid 22 in the membrane thickness direction can be determined as the length L of the node 11 (refer to FIG. 3B). All nodes 11 included in the evaluation region 21 can be evaluated for their lengths L, and the average of the lengths L can be determined as the average length $L_M$.

The upper limit of the average length $L_M$ of the nodes 11 in the stretched porous PTFE membrane 1 is, for example, 70 μm or less, and may be 60 μm or less, 50 μm or less, 40 μm or less, 30 μm or less, or even 20 μm or less. The lower limit of the average length $L_M$ is, for example, 5 μm or more, and may be 7 μm or more or even 9 μm or more. A volume fraction of the node 11 in the stretched porous PTFE membrane 1 is, for example, 5% or more, and may be 7% or more, 8.5% or more, or even 10% or more. The upper limit of the volume fraction is, for example, 30% or less, and may be 25% or less or even 20% or less. The volume fraction in the appropriate range contributes to achievement of the stretched porous PTFE membrane being highly air-permeable and being less likely to suffer breakage. The volume fraction can be evaluated by the above three-dimensional image analysis.

An average of node angles α in the stretched porous PTFE membrane 1 is, for example, 60° or more, and may be 65° or more or even 70° or more. The upper limit of the average of the node angles α is 90° or less, and may be 85° or less or even 80° or less. The average of the node angles α in the appropriate range contributes to achievement of the stretched porous PTFE membrane being highly air-permeable and being less likely to suffer breakage. Assuming that an ellipse having a smallest area among ellipses whose perimeters pass an upper end and a lower end of the node 11 and which encompass the node 11 is on an image of a plane (which is generally the X-Z plane of the membrane cut in the MD direction in the case where stretching A in the MD direction was performed in a method A later described) allowing observation of the thickness of the node 11 and selected from the X-Z plane and the Y-Z plane, the node angle α is an angle made by a major axis of the ellipse and the X-Y plane. The node angle α and the average of the node angles α can be evaluated by the above three-dimensional image analysis (the image of the plane can be extracted from the three-dimensional image of the evaluation region). The average of the node angles α is the average of all nodes 11 included in the evaluation region 21.

An average thickness of the nodes 11 in the stretched porous PTFE membrane 1 is, for example, 0.5 to 5 μm and may be 1 to 3 μm. The average thickness in the appropriate range contributes to achievement of the stretched porous PTFE membrane being less likely to suffer breakage in spite of its high air permeability. The thickness of the node 11 and the average thickness of the nodes 11 can be evaluated by the above three-dimensional image analysis (analysis of an image of a plane allowing observation of the thickness of the node 11 and selected from the X-Z plane and the Y-Z plane). The thickness of the node 11 can be determined as follows. Inscribed circles of the node 11 are drawn for all pixels representing the node 11 on an image of the above plane, the inscribed circles being centered at the pixels. In the case where there are overlapping inscribed circles, only an inscribed circle having the largest area among the overlapping inscribed circles is left. This is repeated until there are no overlapping inscribed circles. The diameters of the remaining inscribed circles are converted into a histogram, and an average (number average) in a distribution of the diameters converted into a histogram can be determined as the thickness of the node 11. The average thickness of the nodes 11 is an average of the thicknesses of all nodes 11 included in the evaluation region 21.

The degree to which the node 11 is divided in the thickness direction is low. As a result, the stretched porous PTFE membrane 1 can have a high air permeability. The stretched porous PTFE membrane 1 may have an air permeability of 4 $cm^3/(sec \cdot cm^2)$ or more, as expressed in terms of Frazier air permeability, in the thickness direction. The air permeability may be 4.5 $cm^3/(sec \cdot cm^2)$ or more, 5.0 $cm^3/(sec \cdot cm^2)$ or more, 6.0 $cm^3/(sec \cdot cm^2)$ or more, 7.0 $cm^3/(sec \cdot cm^2)$ or more, or even 8.0 $cm^3/(sec \cdot cm^2)$ or more. The upper limit of the air permeability is, for example, 20.0 $cm^3/(sec \cdot cm^2)$ or less. It should be noted that a membrane having a higher air permeability tends to have a lower cohesion. Therefore, the effect of the present invention is more significant when the stretched porous PTFE membrane 1 has a high air permeability. However, an in-plane air permeability of the stretched porous PTFE membrane 1 may not be high. The membrane 1 may have an in-plane air permeability, for example, lower than the above range.

The Frazier air permeability is determined according to Method A for air permeability measurement (Frazier method) defined in Japanese Industrial Standards (hereinafter referred to as "JIS") L 1096. Even for the stretched porous PTFE membrane 1 whose dimensions are smaller than those (about 200 mm×200 mm) of a specimen defined in the Frazier method, the Frazier air permeability can be evaluated using a measurement jig for limiting the area of a measurement region. One example of the measurement jig is a resin sheet provided with, at the center thereof, a through hole having a cross-sectional area corresponding to the area of a desirable measurement region. For example, a measurement jig provided with, at the center thereof, a through hole having a circular cross-section and having a diameter equal to or less than 1 mm can be used.

Owing to the above node-fibril structure, the stretched porous PTFE membrane 1 can have a high cohesion (peel cohesion) in all in-plane directions on average. The stretched porous PTFE membrane 1 may have a total cohesion of 1.9

(N/20 mm)$^2$ or more. In this case, the above breakage can further be reduced. The total cohesion is expressed by a product of a peel cohesion of the stretched porous PTFE membrane 1 in a first in-plane direction and a peel cohesion thereof in a second in-plane direction perpendicular to the first direction. The first direction is, for example, the MD direction. The second direction is, for example, the TD direction. The total cohesion may be 2.0 (N/20 mm)$^2$ or more, 2.5 (N/20 mm)$^2$ or more, 2.8 (N/20 mm)$^2$ or more, or even 3.0 (N/20 mm)$^2$ or more. The upper limit of the total cohesion is, for example, 25.0 (N/20 mm)$^2$ or less, and may be 20.0 (N/20 mm)$^2$ or less, 15.0 (N/20 mm)$^2$ or less, 10.0 (N/20 mm)$^2$ or less, 8.0 (N/20 mm)$^2$ or less, or even 6.4 (N/20 mm)$^2$ or less.

A stretched porous PTFE membrane can be formed generally by stretching an unstretched PTFE sheet that is a raw sheet in two in-plane directions perpendicular to each other, such as the MD direction and the TD direction. Conditions for stretching in one direction are generally different from conditions for stretching in the other direction, and therefore the mechanical properties of the membrane generally vary between the two directions perpendicular to each other. According to studies by the present inventors, for example, when a stretched porous PTFE membrane having a high peel cohesion in one direction but a low peel cohesion in the other direction is included in a filter member, the membrane tends to suffer breakage at the time of handling the member or placing the member on a housing. The total cohesion is the product of the peel cohesion in the first in-plane direction and the peel cohesion in the second in-plane direction perpendicular to the first direction. According to studies by the present inventors, the stretched porous PTFE membrane 1 having a total cohesion of 1.9 (N/20 mm)$^2$ or more can be considered to have a high in-plane peel cohesion on average.

The peel cohesion of the stretched porous PTFE membrane 1 in the first direction is, for example, 1.70 (N/20 mm) or more, and may be 1.80 (N/20 mm) or more, 1.90 (N/20 mm) or more, or even 2.00 (N/20 mm) or more.

The peel cohesion of the stretched porous PTFE membrane 1 in the second direction is, for example, 1.15 (N/20 mm) or more, and may be 1.20 (N/20 mm) or more, 1.40 (N/20 mm) or more, 1.50 (N/20 mm) or more, 1.60 (N/20 mm) or more, or even 1.70 (N/20 mm) or more.

An average cohesion, which is expressed by an average (arithmetic mean) of the peel cohesion in the first direction and the peel cohesion in the second direction, of the stretched porous PTFE membrane 1 is, for example, 1.40 (N/20 mm) or more, and may be 1.50 (N/20 mm) or more, 1.60 (N/20 mm) or more, 1.70 (N/20 mm) or more, or even 1.80 (N/20 mm) or more.

The stretched porous PTFE membrane 1 can achieve both the air permeability in the thickness direction and the total cohesion at high levels. The stretched porous PTFE membrane 1 may satisfy an inequality $C_T \geq -0.33 \times P_T + 3.67$ or an inequality $C_T \geq -0.57 \times P_T + 6.14$, where $P_T$ represents the air permeability in the thickness direction and $C_T$ represents the total cohesion.

In the present specification, PTFE includes a modified PTFE. In other words, the stretched porous PTFE membrane 1 includes a stretched porous membrane formed of a modified PTFE. The modified PTFE is a copolymer of tetrafluoroethylene (hereinafter referred to as "TFE") and a modified comonomer. A TFE unit content in the copolymer is, for example, 95 mass % or more, preferably 97 mass % or more, and more preferably 99 mass % or more. The modified comonomer is, for example, at least one selected from the group consisting of ethylene, perfluoroalkyl vinyl ether, hexafluoropropylene, and perfluoromethyl vinyl ether. However, the modified PTFE may be excluded from PTFE. In other words, PTFE may be an unmodified PTFE (a homopolymer of TFE).

The PTFE included in the stretched porous PTFE membrane 1 may have a standard specific gravity (SSG) of 2.18 or less. The term "SSG" is defined in JIS K 6935-1.

The stretched porous PTFE membrane 1 has a mass per unit area of, for example, 1.0 g/m$^2$ or more, and may have a mass per unit area of 7.0 g/m$^2$ or more, 8.0 g/m$^2$ or more, 10.0 g/m$^2$ or more, 12.0 g/m$^2$ or more, or even 13.0 g/m$^2$ or more. The upper limit of the mass per unit area is, for example, 87.2 g/m$^2$ or less. The mass per unit area can be determined by dividing the wEight of the stretched porous PTFE membrane 1 by the area of a principal surface thereof.

The stretched porous PTFE membrane 1 has a thickness of, for example, 10 μm or more, and may have a thickness of 30 μm or more, 35 μm or more, 40 μm or more, or even 45 μm or more. The upper limit of the thickness is, for example, 200 μm or less, and may be 100 μm or less.

The stretched porous PTFE membrane 1 has a porosity of, for example, 80% or more, and may have a porosity of 85% or more, 88% or more, or even 90% or more. The upper limit of the porosity is, for example, 99% or less. The porosity can be calculated by substituting the weight, the thickness, and the area (area of a principal surface) of the membrane and the true density of PTFE in the following equation. The true density of PTFE is 2.18 g/cm$^3$.

$$\text{Porosity } (\%)=\{1-(\text{mass [g]}/(\text{thickness [cm]}\times\text{area [cm}^2]\times\text{true density [g/cm}^3]))\}\times 100$$

The stretched porous PTFE membrane 1 has a bulk density of, for example, 0.30 g/cm$^3$ or less, and may have a bulk density of 0.25 g/cm$^3$ or less, 0.20 g/cm$^3$ or less, 0.19 g/cm$^3$ or less, 0.18 g/cm$^3$ or less, 0.16 g/cm$^3$ or less, or even 0.15 g/cm$^3$ or less. The lower limit of the bulk density is, for example, 0.08 g/cm$^3$ or more. The bulk density in the appropriate range contributes to achievement of the stretched porous PTFE membrane being highly air-permeable and being less likely to suffer breakage. The bulk density can be determined from the mass per unit area and the thickness of the stretched porous PTFE membrane 1.

The stretched porous PTFE membrane 1 has a water entry pressure (limit water entry pressure) of, for example, 30 kPa or more, and may have a water entry pressure of 35 kPa or more, 40 kPa or more, 44 kPa or more, or even 50 kPa or more. The upper limit of the water entry pressure is, for example, 500 kPa or less. The water entry pressure can be measured in the following manner according to Method A (low water pressure method) or Method B (high water pressure method) of the water resistance test in JIS L 1092 using a measurement jig.

An example of the measurement jig is a 47 mm diameter stainless steel disc provided with a 1 mm diameter through hole (having a circular cross-section) at the center thereof. This disc has a thickness sufficient to prevent the disc from deforming due to a water pressure applied to measure the water entry pressure. The water entry pressure can be measured in the following manner using this measurement jig.

The stretched porous PTFE membrane 1 to be evaluated is fixed to one surface of the measurement jig to cover an opening of the through hole of the jig. The membrane is fixed so that water will not leak from a fixed portion of the membrane during the measurement of the water entry pressure. To fix the membrane, a double-sided adhesive tape on which a water port having a shape corresponding to the shape of the opening is punched in a central part can be used. The double-sided adhesive tape can be placed between the measurement jig and the membrane such that the circumference of the water port and that of the opening are aligned. Next, the measurement jig to which the membrane is fixed is set in a test apparatus such that the surface opposite to the surface on which the membrane is fixed is a surface to which a water pressure is applied during the measurement. Then, the water entry pressure is measured according to Method A (low water pressure method) or Method B (high water pressure method) of the water resistance test in JIS L 1092. It should be noted that the water entry pressure measured is a water pressure that causes water to come out from one spot of the membrane surface of the stretched porous PTFE membrane 1. The measured water entry pressure can be employed as the water entry pressure of the stretched porous PTFE membrane 1. As the test apparatus can be used an apparatus having a specimen installation structure that allows the measurement jig to be set therein, the apparatus having the same configuration as the water resistance test apparatus exemplified in JIS L 1092.

The stretched porous PTFE membrane 1 may be a single-layer membrane.

The stretched porous PTFE membrane 1 may have been subjected to liquid-repellent treatment such as water-repellent treatment and oil-repellent treatment. The liquid-repellent treatment can be performed by coating with a liquid-repellent substance such as a fluorine compound. A known method can be employed for the coating.

The stretched porous PTFE membrane 1 may have been subjected to coloring treatment. The coloring treatment can be performed, for example, by dyeing the stretched porous PTFE membrane 1 or impregnating the stretched porous PTFE membrane 1 with a colorant. The coloring treatment may be performed so that light having a wavelength in the range of 380 to 500 nm will be absorbed. In that case, the stretched porous PTFE membrane 1 can be colored, for example, blue, gray, brown, pink, green, or yellow.

The stretched porous PTFE membrane 1 can be included, for example, in an air-permeable medium having air permeability in a thickness direction of the air-permeable medium and preventing a foreign matter from passing therethrough in the thickness direction. Examples of the foreign matter include particles such as dust and liquid water such as a water drop. However, the application of the stretched porous PTFE membrane 1 is not limited to the above example.

The stretched porous PTFE membrane 1 can be manufactured, for example, by the following method A. The stretched porous PTFE membrane 1 may be a membrane obtained by the method A. However, the method for manufacturing the stretched porous PTFE membrane 1 is not limited to the method A.

[Method A]

Stretching an unsintered PTFE sheet in a given direction at a stretching temperature lower than the melting point of PTFE (stretching A);

sintering the sheet having undergone the stretching A at a temperature equal to or higher than the melting point of PTFE (sintering B); and further stretching the sheet having undergone the sintering B in a direction different from the above given direction at a stretching temperature lower than the melting point of PTFE (stretching C).

(Stretching A)

In the stretching A, an unsintered PTFE sheet is stretched in a given direction at a stretching temperature less than the melting point (343° C., which is the melting point of a PTFE crystal) of PTFE. The stretching A can be performed, for example, in a heating furnace controlled at a temperature (stretching temperature) at which the stretching A is performed. The stretching A can be performed, for example, by roll stretching. The method for performing the stretching A is not limited to the above example.

The stretching temperature of the stretching A is, for example, 200 to 340° C., and may be 280 to 330° C.

The stretching ratio of the stretching A is, for example, 1.5 to 10.0, and may be 2.0 to 8.0. The stretching ratio is preferably 4.0 to 5.0 for achieving both the air permeability in the thickness direction and the total cohesion at higher levels. The stretching ratio is preferably 3.0 to 4.0 for achieving both the air permeability in the thickness direction and the total cohesion at high levels and improving the water entry pressure.

The direction (given direction) of the stretching A is, for example, the MD direction of the PTFE sheet. When the PTFE sheet is in a strip shape, the direction of the stretching A may be a longitudinal direction of the PTFE sheet.

The stretching A is performed preferably in a state where the stretching degree per unit time is suppressed. The suppressed stretching A is thought to contribute to formation of the stretched porous PTFE membrane 1 having the above node-fibril structure. According to studies by the present inventors, the node 11 that is long not only in an in-plane direction but also in the thickness direction of the membrane tends to be formed by the suppressed stretching A and the subsequent sintering B. The suppressed stretching can be performed, for example, by decreasing the stretching ratio per unit time. The stretching ratio per unit time is, for example, 0.5 to 5.0 per minute as expressed by a strain rate, and may be 0.5 to 3.0 per minute, 0.5 to 2.0 per minute, or even 0.5 to 1.9 per minute. The strain rate can be determined by dividing a stretching rate (m/min) by a stretching distance (m). The strain rate is generally constant in the stretching A.

(Sintering B)

In the sintering B, the sheet having undergone the stretching A is sintered at a temperature equal to or higher than the melting point of PTFE. The sintering B can be performed, for example, in a heating furnace controlled at a temperature (sintering temperature) at which the sintering B is performed.

The sintering temperature is, for example, 350 to 400° C. and may be 355 to 395° C. The sintering time is, for example, 10 to 40 seconds and may be 12 to 38 seconds.

The sintering B is performed preferably in a state where the sheet is not being stretched. It is inferred that performing the sintering in such a state between the stretching A and the stretching C contributes to formation of the stretched porous PTFE membrane having the above node-fibril structure. According to studies by the present inventors, the above node 11 formed by the stretching A is heat-set by the sintering B. The above structure of the node 11 is therefore maintained even through the stretching C by which a gap between the fibrils is expanded. However, slight stretching and shrinkage of the sheet are acceptable for correcting its slack and stretch that can be caused by a temperature change. The stretching ratio acceptable in the sintering B is, for example, 0.80 to 2.00 and is preferably 0.90 to 1.10. A stretching ratio of less than 1 represents shrinkage. The stretched porous PTFE membrane 1 obtained by the sintering B is a sintered membrane. From this aspect, the stretched porous PTFE membrane 1 may be a sintered membrane.

(Stretching C)

In stretching C, the sheet having undergone the sintering B is further stretched in a direction different from the above given direction at a stretching temperature lower than the melting point of PTFE. The stretching C can be performed, for example, in a heating furnace controlled at a temperature (stretching temperature) at which the stretching C is performed. The stretching C can be performed, for example, by tenter stretching. The method for performing the stretching C is not limited to the above example.

The stretching temperature of the stretching C is, for example, 40 to 340° C. and may be 100 to 330° C.

The stretching ratio of the stretching C is, for example, 2 to 15 and may be 4 to 10.

The direction of the stretching C is typically an in-plane direction approximately perpendicular to the direction of the stretching A. The direction of the stretching C is, for example, the TD direction of the PTFE sheet. When the PTFE sheet is in a strip shape, the direction of the stretching C may be the width direction of the PTFE sheet.

In the method A, if necessary, additional stretching other than the stretching A and the stretching C may be performed. However, the first stretching for the PTFE sheet is preferably the stretching A. In the method A, only the stretching A and the stretching C may be performed as stretching of the PTFE sheet. The stretching A, the sintering B, and the stretching C may be performed successively.

The stretched porous PTFE membrane 1 obtained by the method A is typically a biaxially stretched membrane. From this aspect, the stretched porous PTFE membrane 1 may be a biaxially stretched membrane.

The unsintered PTFE sheet used in the method A can be formed, for example, by shaping a mixture of a fine PTFE powder and a liquid lubricant into a sheet shape by extrusion and/or calendering. The liquid lubricant is preferably removed from the PTFE sheet by heating, extraction, or the like before the stretching A. Additionally, after the removal of the liquid lubricant, it is preferable that a compression force not be applied to the unsintered PTFE sheet in the thickness direction. In other words, it is preferred that the PTFE sheet (non-densified sheet) not having been densified by application of the above compression force is stretched.

As the fine PTFE powder can be used commercially-available products, for example, POLYFLON F-104 (manufactured by DAIKIN INDUSTRIES, LTD.), Fluon CD-123E, Fluon CD-145E (manufactured by AGC INC.), and Teflon 6J (manufactured by Chemours-Mitsui Fluoroproducts Co., Ltd.).

Examples of the liquid lubricant include hydrocarbon oils, such as liquid paraffin, naphtha, white oil, toluene, and xylene, alcohols, ketones, and esters. However, the liquid lubricant is not limited to the above examples as long as the liquid lubricant can wet a surface of the fine PTFE powder and can be removed after shaping of the above mixture into a sheet shape.

A mixing ratio of the fine PTFE powder to the liquid lubricant is generally 100 parts by weight to about 5 to 50 parts by weight.

The thickness of the unsintered PTFE sheet can be adjusted according to the intended stretched porous PTFE membrane 1, and is, for example, about 0.05 to 0.5 mm.

In the method A, an optional step can be performed after the stretching C, if necessary. The step is, for example, heat-setting in which the sheet is held at a temperature equal to or higher than the melting point of PTFE. The structure of the stretched sheet is maintained by the heat-setting. The heat-setting can be performed in the same manner as in the sintering B. The heat-setting may be performed sequentially after the stretching C.

[Air-Permeable Medium]

Figure 4:
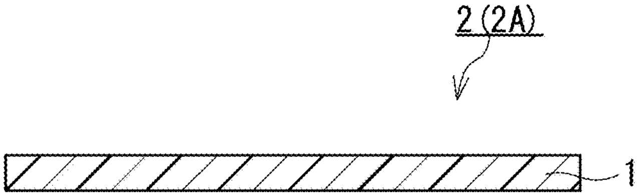
FIG. 4 is a cross-sectional view schematically showing an example of an air-permeable medium of the present invention.

FIG. 4 shows an example of an air-permeable medium of the present invention.

Figure 5:
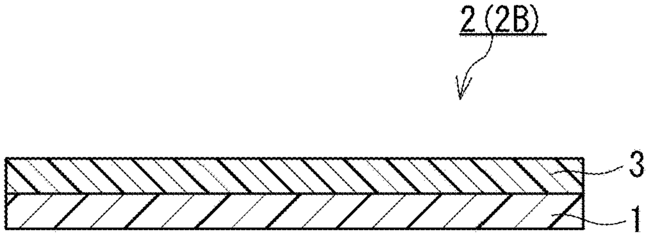
FIG. 5 is a cross-sectional view schematically showing another example of the air-permeable medium of the present invention.

An air-permeable medium 2 (2A) of FIG. 4 includes the stretched porous PTFE membrane 1. FIG. 5 shows another example of the air-permeable medium of the present invention. The air-permeable medium 2 (2B) of FIG. 5 further includes an air-permeable supporting member 3. The air-permeable supporting member 3 is laminated on the stretched porous PTFE membrane. The air-permeable supporting member 3 can improve the strength and the handleability of the air-permeable medium 2.

The air-permeable supporting member 3 generally has a high air permeability in its thickness direction, compared to that of the stretched porous PTFE membrane 1. Examples of the air-permeable supporting member 3 include a woven fabric, a non-woven fabric, a net, and a mesh. Examples of the material of the air-permeable supporting member 3 include polyesters such as polyethylene terephthalate (PET), polyolefins such as polyethylene (PE) and polypropylene (PP), and aramid resins. The shape of the air-permeable supporting member 3 may be the same as or different from that of the stretched porous PTEF membrane 1 when the air-permeable medium 2 is viewed perpendicularly to a principal surface thereof. The air-permeable supporting member 3 may have a shape corresponding to a peripheral portion of the stretched porous PTFE membrane 1 when the air-permeable medium 2 is viewed perpendicularly to a principal surface thereof. The shape corresponding to the peripheral portion of the stretched porous PTFE membrane 1 is a ring shape when the stretched porous PTFE membrane 1 is circular. The configuration and the shape of the air-permeable supporting member 3 are not limited to the above examples.

The air-permeable medium 2B includes one air-permeable supporting member 3 placed on one of the surfaces of the stretched porous PTFE membrane 1. The air-permeable medium 2 may include two or more air-permeable supporting members 3. In the air-permeable medium 2, the air-permeable supporting member 3 may be placed on each surface of the stretched porous PTFE membrane 1. The stretched porous PTFE membrane 1 and the air-permeable supporting member 3 may be joined by welding such as heat welding or ultrasonic welding or by using an adhesive (including a pressure-sensitive adhesive).

The air-permeable medium 2 may include an optional layer and/or member other than those described above.

The thickness of the air-permeable medium 2 is, for example, 10 to 300 μm and may be 50 to 200 μm.

The air-permeable medium 2 has a mass per unit area of, for example, 1.0 to 200.0 $g/m^2$ and may have a mass per unit area of 10.0 to 100.0 $g/m^2$.

The air-permeable medium 2 can have the same properties, such as the air permeability in the thickness direction and/or the water entry pressure, as the properties of the stretched porous PTFE membrane 1.

The air-permeable medium 2 may have been subjected to liquid-repellent treatment and/or coloring treatment.

The air-permeable medium 2 is in the shape of, for example, a polygon such as a square or a rectangle, a circle, an oval, or a strip when viewed perpendicularly to a principal surface of the air-permeable medium 2. The polygon may have a rounded corner. However, the shape of the air-permeable medium 2 is not limited to the above examples. The strip-shaped air-permeable medium 2 may be wound to form a wound body. If necessary, the strip-shaped air-permeable medium 2 may be wound with a release sheet (separator) laminated thereon.

The area of the sheet-shaped air-permeable medium 2 having any of the above shapes such as a polygon, a circle, or an oval may be 675 $mm^2$ or less or 175 $mm^2$ or less. The lower limit of the area is, for example, 0.20 $mm^2$ or more. The air-permeable medium 2 having the above area is suitable for being included in a downsized filter member. However, the area of the air-permeable medium 2 may be greater depending on the application thereof.

The air-permeable medium 2 can be included, for example, in a filter member. However, the application of the air-permeable medium 2 is not limited to the above example.

[Filter Member]

Figure 6:
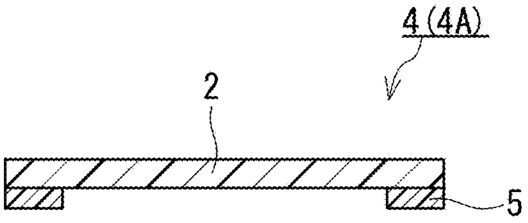
FIG. 6 is a cross-sectional view schematically showing an example of a filter member of the present invention.

FIG. 6 shows an example of a filter member of the present invention. A filter member 4 (4A) of FIG. 6 includes the above-described air-permeable medium 2 as an air-permeable medium having air permeability in a thickness direction of the air-permeable medium and preventing a foreign matter from passing therethrough in the thickness direction. The filter member 4A is, for example, a member placed on a surface of an object to prevent a foreign matter from passing through an opening of the surface and ensure ventilation through the opening. In this case, the filter member 4A is generally placed such that the air-permeable medium 2 covers the opening of the object.

The filter member 4A includes an adhesive layer 5 placed on one of the surfaces of the air-permeable medium 2. The air-permeable medium 2 and the adhesive layer 5 are directly joined. The filter member 4A can be placed on the above surface of the object with the adhesive layer 5 interposed therebetween.

In some cases, a strong force is applied to the filter member 4 in a particular direction at the time of handling the filter member 4 or placing the filter member 4 on the object. The air-permeable medium 2 includes the stretched porous PTFE membrane 1 that has the specific node-fibril structure and that can have a high total cohesion. This makes it possible to manufacture the filter member 4, for example, without limiting a direction of placing the air-permeable medium 2 (or the stretched porous PTFE membrane 1) on the filter member 4.

Examples of an adhesive forming the adhesive layer 5 include an acrylic-based adhesive, a silicone-based adhesive, a urethane-based adhesive, an epoxy-based adhesive, and a rubber-based adhesive. It is preferred that an acrylic- or silicone-based adhesive, which is highly heat resistant, particularly a silicone-based adhesive, be selected when use of the filter member 4 under high temperatures needs to be taken into account. The adhesive layer 5 may be a substrate-less double-sided adhesive tape. The adhesive may be a curable adhesive such as a phenolic resin, an epoxy resin, a urea resin, a polyurethane resin, a melamine resin, or a polyester resin.

An outer perimeter of the air-permeable medium 2 and an outer perimeter of the adhesive layer 5 coincide when the air-permeable medium 2 is viewed perpendicularly to a principal surface thereof. Moreover, the shape of the adhesive layer 5 corresponds to that of a peripheral portion of the air-permeable medium 2 when the air-permeable medium 2 is viewed perpendicularly to a principal surface thereof. The air-permeable medium 2 has a region with which the adhesive layer 5 is not joined, and the region can be defined as an air-permeable region of the filter member 4A. However, the shape of the adhesive layer 5 is not limited to the above example.

The area of the air-permeable region is, for example, 40 $mm^2$ or less. The filter member 4 having the air-permeable region having an area within this range is, for example, suitable for being placed on an object having a small-diameter opening. The lower limit of the area of the air-permeable region is, for example, 0.008 $mm^2$ or more. However, the area of the air-permeable region may be larger depending on the type of object on which the filter member 4 is placed.

Figure 7:
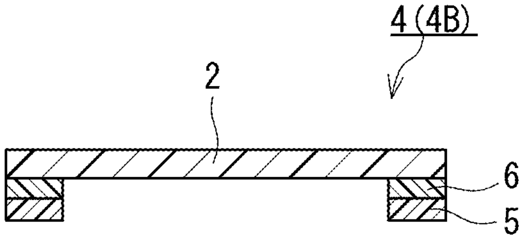
FIG. 7 is a cross-sectional view schematically showing another example of the filter member of the present invention.

Modifications of the filter member 4 will be described hereinafter. The filter member 4 (4B) of FIG. 7 has the same configuration as that of the filter member 4A, except that the filter member 4B further includes a substrate layer 6 placed on one surface of the air-permeable medium 2 and that the air-permeable medium 2 and the adhesive layer 5 are joined with the substrate layer 6 interposed therebetween. The substrate layer 6 can improve the strength and the handleability of the filter member 4 and can prevent breakage of the air-permeable medium 2 at the time of handling the filter member 4 or placing the filter member 4 on the object.

Examples of the material of the substrate layer 6 include polyolefins such as PE and PP, polyesters such as PET, silicone resins, polycarbonate, polyimides, polyamide-imide, polyphenylene sulfide, polyetheretherketone (PEEK), polyvinyl chloride, fluorine resins, and metals such as aluminum and stainless steel. Examples of the fluorine resin include PTFE, tetrafluoroethylene-perfluoroalkyl vinyl ether copolymer (PFA), tetrafluoroethylene-hexafluoropropylene copolymer (FEP), and tetrafluoroethylene-ethylene copolymer (ETFE). However, the material of the substrate layer 6 is not limited to the above examples.

The outer perimeter of the air-permeable medium 2 and an outer perimeter of the substrate layer 6 coincide when the air-permeable medium 2 is viewed perpendicularly to a principal surface thereof. Moreover, the shape of the substrate layer 6 corresponds to that of the peripheral portion of the air-permeable medium 2 when the air-permeable medium 2 is viewed perpendicularly to a principal surface thereof. The air-permeable medium 2 has a region with which the substrate layer 6 is not joined, and the region can be defined as an air-permeable region of the filter member 4B. However, the shape of the substrate layer 6 is not limited to the above example.

The air-permeable medium 2 and the substrate layer 6 may be joined by using an adhesive (including a pressure-sensitive adhesive) or by welding such as heat welding or ultrasonic welding. The air-permeable medium 2 and the substrate layer 6 may be joined by an adhesive layer. The adhesive layer can have the same configuration as that of the adhesive layer 5. The substrate layer 6 and the adhesive layer 5 may be a substrate and an adhesive layer, respectively, of a single-sided adhesive tape or a double-sided adhesive tape.

Figure 8:
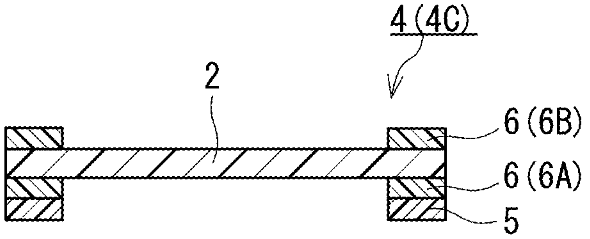
FIG. 8 is a cross-sectional view schematically showing yet another example of the filter member of the present invention.

The filter member 4 (4C) of FIG. 8 has the same configuration as that of the filter member 4B, except that the filter member 4C further includes another substrate layer 6 (6B) placed on the other surface of the air-permeable medium 2. The air-permeable medium 2 is sandwiched by the pair of substrate layers 6 (6A and 6B). This sandwich structure can further improve the strength and the handleability of the filter member 4.

Figure 9:
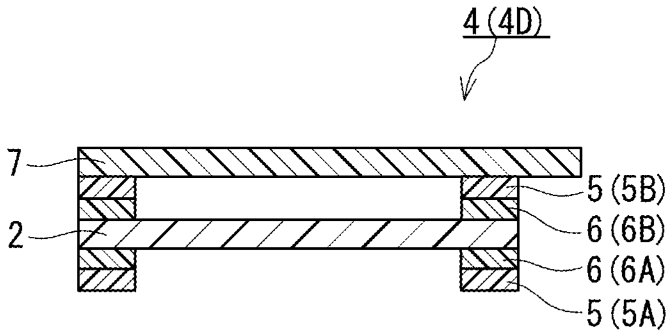
FIG. 9 is a cross-sectional view schematically showing still another example of the filter member of the present invention.

The filter member 4 (4D) of FIG. 9 has the same configuration as that of the filter member 4C, except that the filter member 4D further includes a tab film 7 and that the substrate layer 6 (6B) and the tab film 7 are joined with another adhesive layer 5 (5B) interposed therebetween. The tab film 7 has a tab protruding outward with respect to an outer perimeter of the substrate layer 6B when viewed perpendicularly to a principal surface of the substrate layer 6B. The filter member 4D can be handled and placed on the surface of the object by holding the tab. The tab film 7 is commonly removed when the filter member 4D is used. The tab film 7 can be formed of the same material as the material of the substrate layer 6. The tab film 7 is commonly removed by holding and lifting the tab. At this moment, a strong force is applied to the air-permeable medium 2 in a lifting direction.

Figure 10:
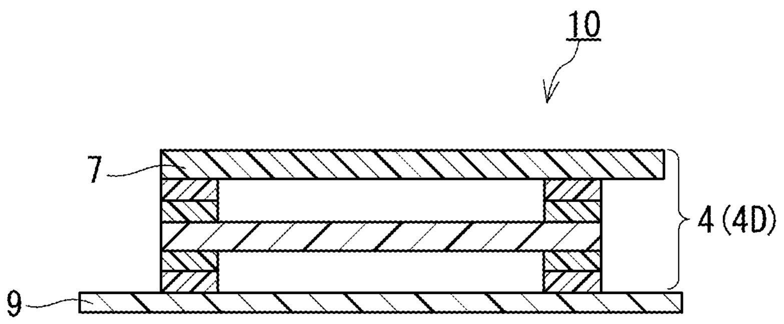
FIG. 10 is a cross-sectional view schematically showing an example of an embodiment of supplying the filter member of the present invention.
Figure 11A:
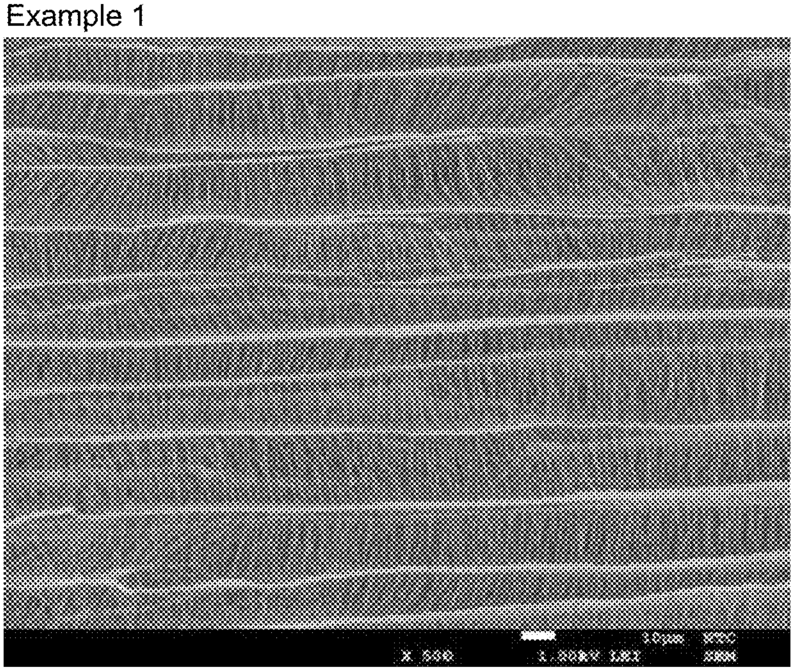
FIG. 11A shows an image of a surface of a stretched porous PTFE membrane of Example 1 observed using a scanning electron microscope (SEM).
Figure 11B:
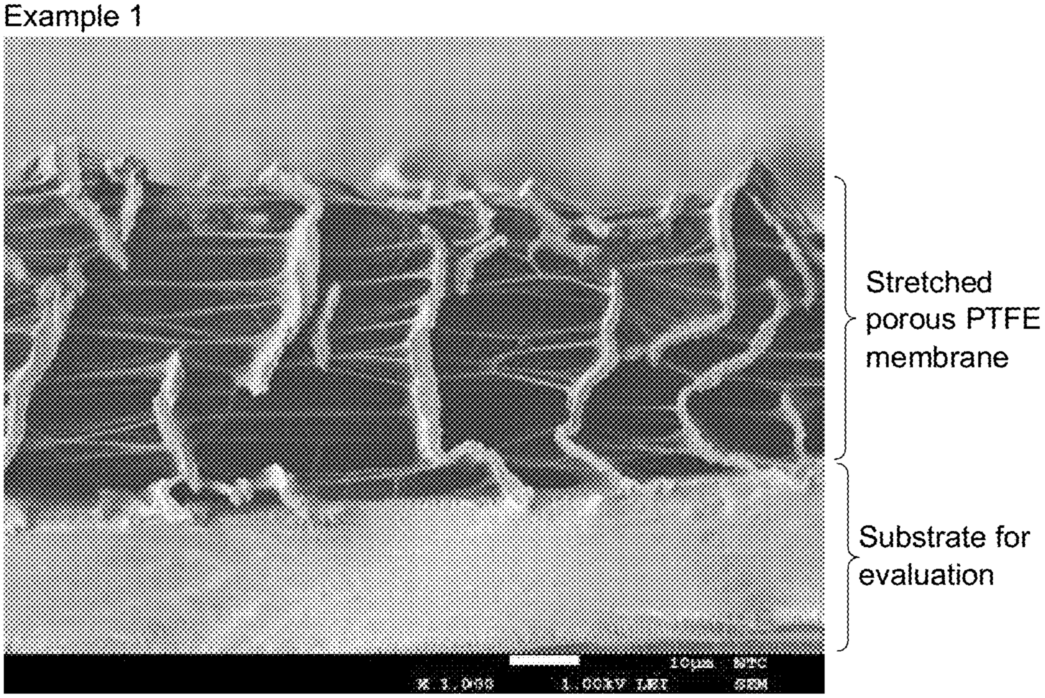
FIG. 11B shows a cross-section in a thickness direction of the stretched porous PTFE membrane (cut in the MD direction) of Example 1 observed using a SEM.
Figure 12A:
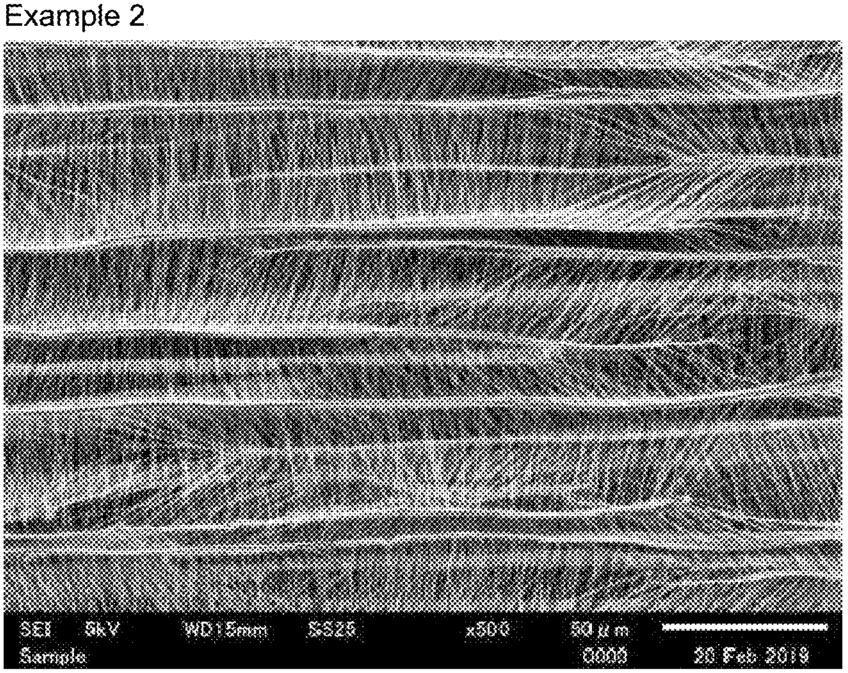
FIG. 12A shows an image of a surface of a stretched porous PTFE membrane of Example 2 observed using a SEM.
Figure 12B:
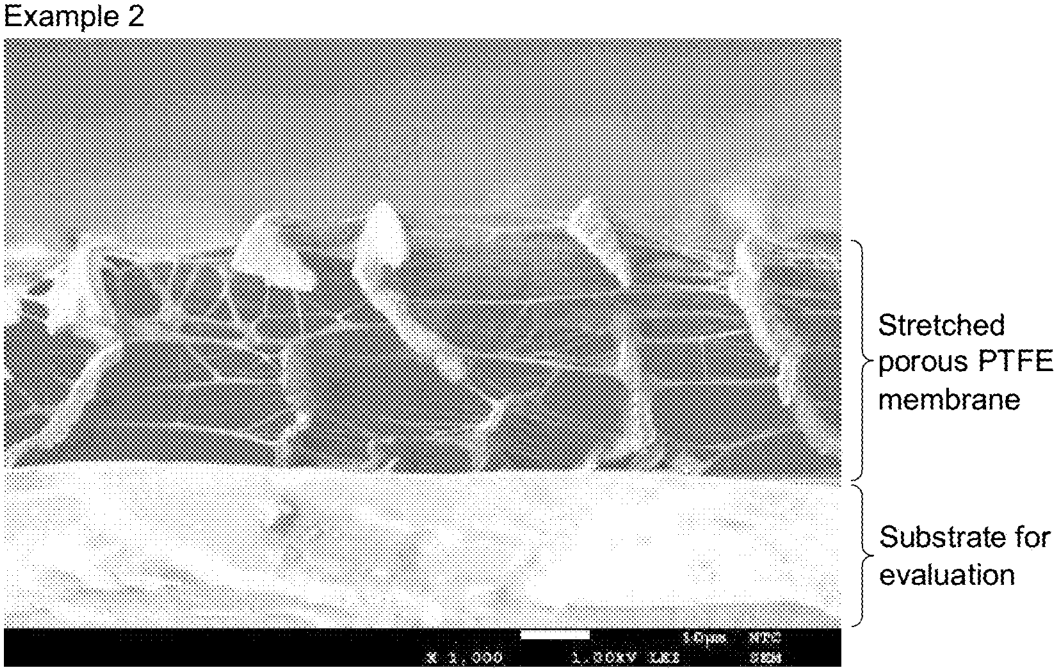
FIG. 12B shows a cross-section in a thickness direction of the stretched porous PTFE membrane (cut in the MD direction) of Example 2 observed using a SEM.
Figure 13A:
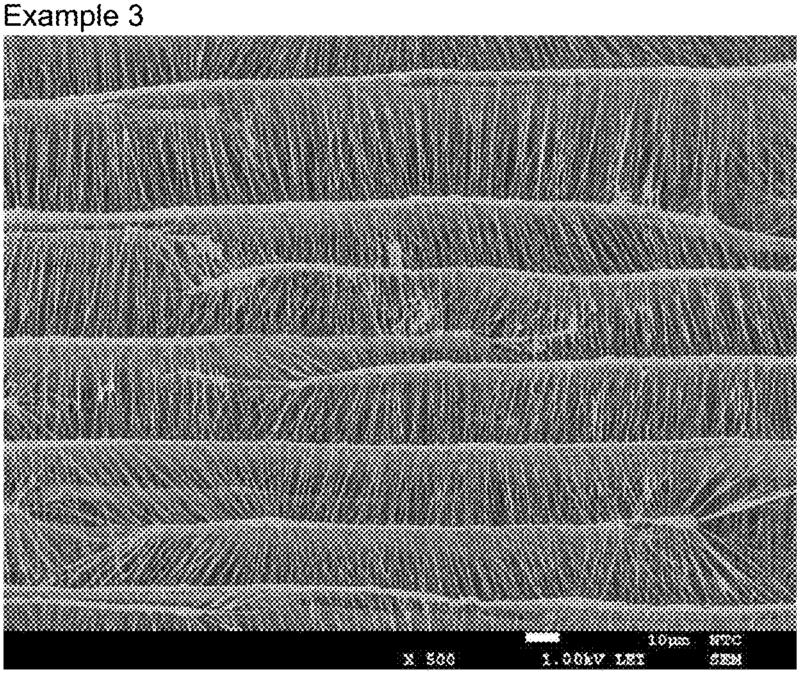
FIG. 13A shows an image of a surface of a stretched porous PTFE membrane of Example 3 observed using a SEM.
Figure 13B:
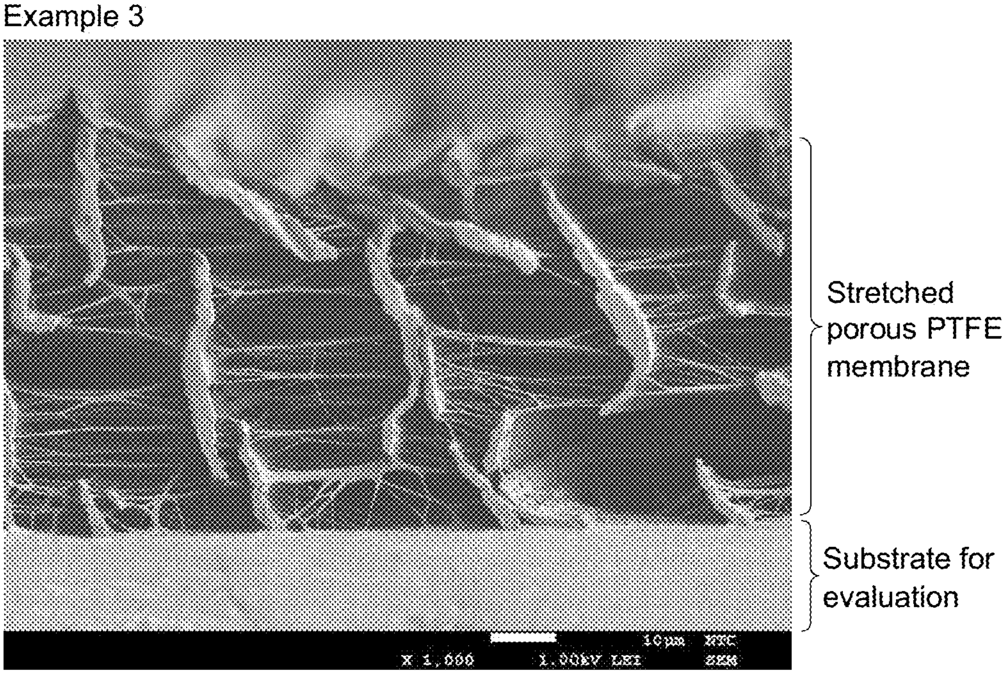
FIG. 13B shows a cross-section in a thickness direction of the stretched porous PTFE membrane (cut in the MD direction) of Example 3 observed using a SEM.
Figure 14A:
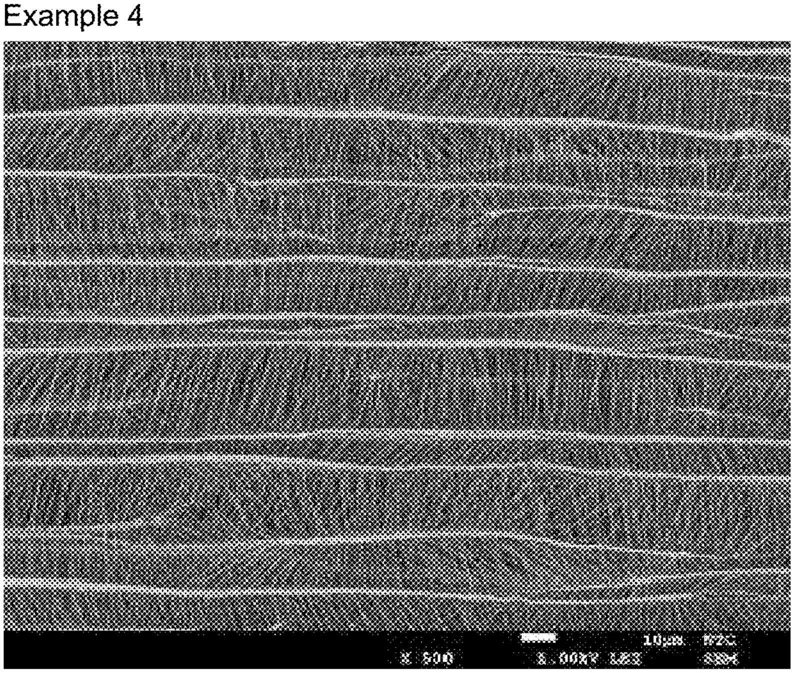
FIG. 14A shows an image of a surface of a stretched porous PTFE membrane of Example 4 observed using a SEM.
Figure 14B:
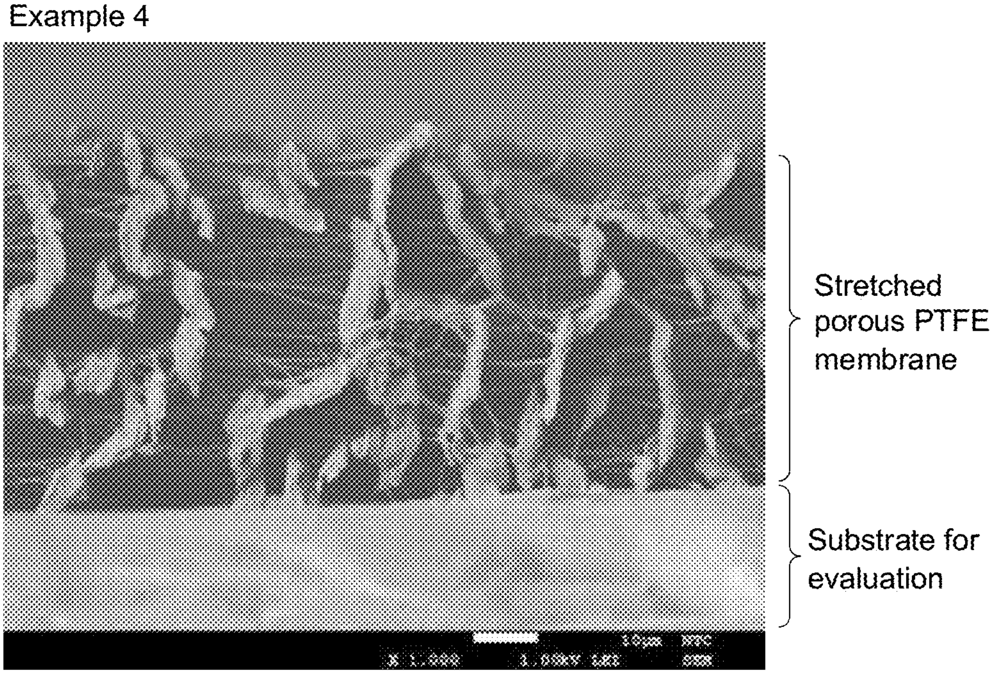
FIG. 14B shows a cross-section in a thickness direction of the stretched porous PTFE membrane (cut in the MD direction) of Example 4 observed using a SEM.
Figure 15A:
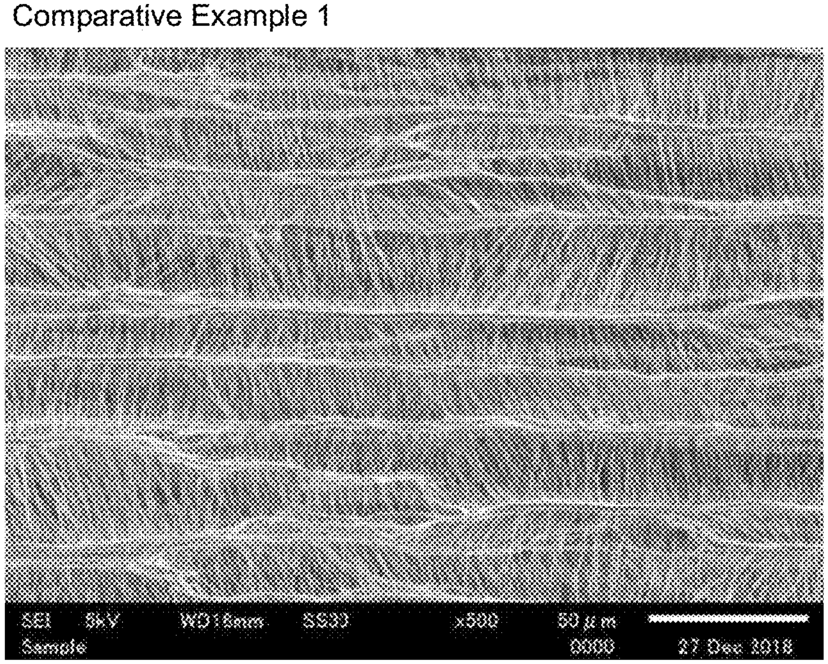
FIG. 15A shows an image of a surface of a stretched porous PTFE membrane of Comparative Example 1 observed using a SEM.
Figure 15B:
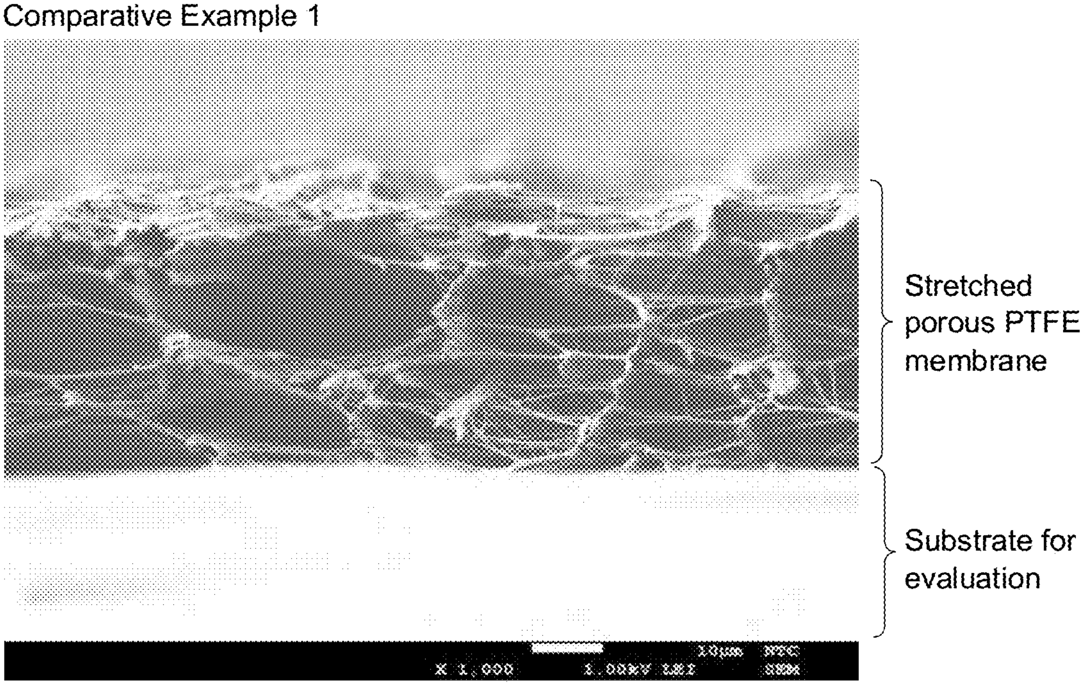
FIG. 15B shows a cross-section in a thickness direction of the stretched porous PTFE membrane (cut in the MD direction) of Comparative Example 1 observed using a SEM.
Figure 16A:
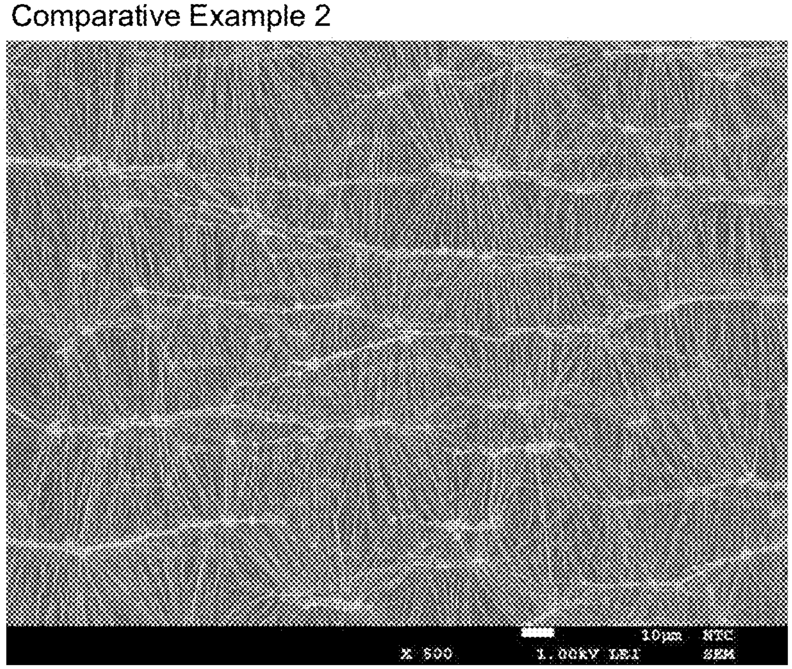
FIG. 16A shows an image of a surface of a stretched porous PTFE membrane of Comparative Example 2 observed using a SEM.
Figure 16B:
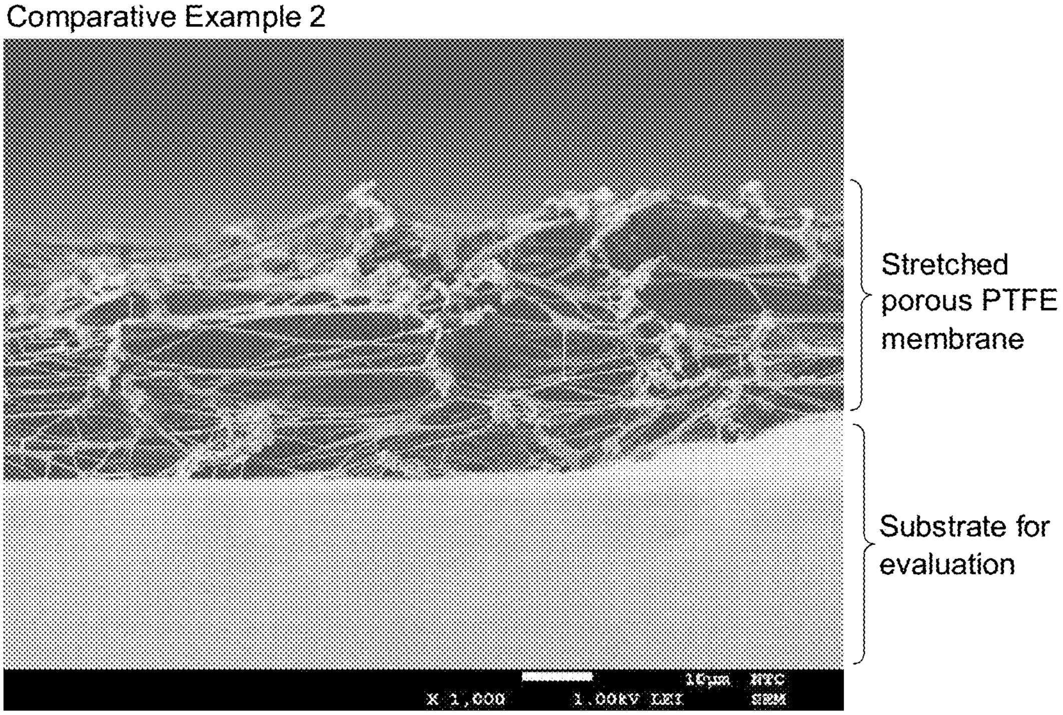
FIG. 16B shows a cross-section in a thickness direction of the stretched porous PTFE membrane (cut in the MD direction) of Comparative Example 2 observed using a SEM.

The filter member 4 can be supplied, for example, using a member supplying sheet. FIG. 10 shows an example of a member supplying assembly which is an embodiment of supplying the filter member 4 using the sheet. A member supplying assembly 10 of FIG. 10 includes a member supplying sheet 9 and the filter member 4 (4D) placed on the sheet 9. The filter member 4 is placed on the sheet 9 with the adhesive layer 5 (5A) interposed therebetween. Using the member supplying assembly 10, the filter member 4 can be efficiently supplied, for example, to a step of placing the filter member 4 onto the surface of the object. A plurality of the filter members 4 may be placed on the sheet 9.

The filter member 4 may be placed on the sheet 9 with an adhesive layer interposed therebetween, the adhesive layer being provided on a placement face of the sheet 9 on which the filter member 4 is placed. The adhesive layer on the placement face preferably has weak adhesiveness.

As the stretched porous PTFE membrane 1 is less likely to suffer breakage, for example, the filter member 4 can be lifted and peeled off the sheet 9 without breaking the membrane 1, depending on the configuration of the filter member 4.

Examples of the material of the sheet 9 include paper, a metal, a resin, and a composite material thereof. Examples of the metal include stainless steel and aluminum. Examples of the resin include polyesters such as PET and polyolefins such as PE and PP. However, the material of the sheet 9 is not limited to the above examples. The sheet 9 may be in a sheet shape or a strip shape. When the sheet 9 is in a strip shape, the member supplying assembly 10 may be wound to form a wound body.

The object on which the filter member 4 is placed is, for example, a housing of an electronic device or a housing of an automotive electrical component. The filter member 4 can be placed on an outer surface and/or an inner surface of the housing. In this case, the opening may be a ventilation port and/or a sound-transmitting port provided for the housing. Examples of the electronic device include: wearable devices such as smartwatches and wristbands; various cameras including action cameras and security cameras; information communication equipment such as mobile phones, smartphones, and tablets; virtual reality (VR) devices; augmented reality (AR) devices; and sensor devices. Examples of the automotive electrical component include lamps and ECUs. However, the object is not limited to the above examples.

Examples of a foreign matter prevented from passing through the filter member 4 placed on the object include particles such as dust and liquid water such as a water drop.

EXAMPLES

Hereinafter, the present invention will be described in more detail by examples. The present invention is not limited to the examples given below.

Methods for evaluating stretched porous PTFE membranes are as follows.

[Mass Per Unit Area]

The mass per unit area was determined by the above-described method.

[Structure]

The average length $L_M$ of nodes, the number N of nodes, the volume fraction of the node, the average of the node angles α, and the average thickness of the nodes were evaluated, as described above, by three-dimensional image analysis using an X-ray CT scanner. As the X-ray CT scanner was used Xradia 520 Versa manufactured by ZEISS. As image analysis software was used ImageJ (Ver. 1.47r). The conditions for X-ray CT observation were as follows: Cu-Kα ray; tube voltage of 60 kV; tube current of 83 μA; resolving power of 0.35 μm/pixel. The dimensions of the evaluation region 21 were 280 μm×280 μm in directions parallel to a membrane surface and 140 μm in the thickness direction (the whole thickness of a membrane to be evaluated is included in the thickness direction of the evaluation region 21). The number of serial transmission images obtained for construction of a three-dimensional image of the evaluation region was 1601. On the above image analysis software, binarization was performed by Li's method. Nodes and fibrils were separated by adjustment of a threshold of a denoising command, assuming that a PTFE body having a volume equal to or less than 500 voxels (21.44 $\mu m^3$) was a fibril.

[Thickness]

From a three-dimensional image constructed by the above X-ray CT, 10 images of the Y-Z plane were randomly taken out, and the average of thicknesses determined from the plane images taken out was determined as the thickness of a stretched porous PTFE membrane.

[Water Entry Pressure (Threshold Water Entry Pressure)]

The water entry pressure was determined by the above-described method according to Method B (high water pressure method) of the water resistance test defined in JIS L 1092.

[Porosity]

The porosity was determined by the above-described method.

[Air Permeability in the Thickness Direction]

The air permeability (Frazier air permeability) in the thickness direction was determined by the above-described method according to Method A for air permeability measurement defined in JIS L 1096.

[Total Cohesion]

The total cohesion was determined by the following method. First, a stretched porous PTFE membrane to be measured was cut into a rectangular shape (150 mm in length×20 mm in width). Next, two pieces of a double-sided adhesive tape (No. 5610 manufactured by NITTO DENKO CORPORATION) having the same shape as the stretched porous PTFE membrane were prepared. The pieces of the double-sided adhesive tape were adhered to the one surface and the other surface of the stretched porous PTFE membrane such that their outer perimeters coincided. After that, two rectangular PET films (Lumirror S10 #25 manufactured by Toray Industries, Inc.; thickness: 25 μm) having a length of 200 mm and a width of 20 mm were prepared. The PET films were adhered to one surface and the other surface of the stretched porous PTFE membrane using the pieces of the double-sided adhesive tape. The PET films were adhered such that both long-side edge portions of each PET film coincided with both long-side edge portions of the stretched porous PTFE membrane and one short-side edge portion of each PET film coincided with one short-side edge portion of the stretched porous PTFE membrane. This secured a length (50 mm) at the other short-side edge portion of each PET film, the length being sufficient for chucks of a tensile testing machine to stably hold the PET film. Subsequently, a press-bonding roller with a load of 19.6 N was moved back and forth once over the laminate composed of the PET film, the double-sided adhesive tape, the stretched porous PTFE membrane, the double-sided adhesive tape, and the PET film so as to apply a press-bonding force to the laminate in its thickness direction. After that, the laminate was left at room temperature for 12 hours and then at 60° C. for 1 hour before a tensile test to obtain a specimen. It should be noted that from one stretched porous PTFE membrane were prepared a specimen SMD Cut out such that the MD direction of the membrane coincided with a long side of the specimen and a specimen STD cut out such that the TD direction of the membrane coincided with a long side of the specimen.

Next, a tensile testing machine (TENSILON universal testing machine RTF manufactured by A&D Company, Ltd.) was prepared. Each specimen was held horizontally. A free edge portion of one of the PET films was bent upward and attached to an upper chuck of the tensile testing machine, and a free edge portion of the other PET film was bent downward and attached to a lower chuck of the tensile testing machine. Next, a tensile test (T-peel test) in which the free edge portion of the one PET film was pulled upward and the free edge portion of the other PET film was pulled downward was performed at a measurement temperature of 23±5° C., a measurement humidity of 50±5% RH, and a tensile rate of 300 mm/min to cause cohesive failure in the stretched porous PTFE membrane. After the PET films started to undergo displacement due to the cohesive failure, stress occurring between the chucks and measured for a first 25 mm displacement was ignored, and an average of measurement values of the stress continuously recorded for a subsequent 50 mm displacement was defined as the peel cohesion (unit: N/20 mm) of the stretched porous PTFE membrane. A peel cohesion in the MD direction was determined from the specimen SMD. A peel cohesion in the TD direction was determined from the specimen STD. The total cohesion was then determined as a product of the two peel cohesions.

Example 1

An amount of 100 parts by weight of a fine PTFE powder (unmodified; standard specific gravity (SSG): 2.16) and 19.7 parts by weight of an aliphatic hydrocarbon as a liquid lubricant were uniformly mixed to form a PTFE paste. The PTFE paste was extrusion-molded into a sheet shape using an FT die at a pressure of 2.5 MPa (25 kg/cm$^2$), and was further calendered using a pair of metal rolls to obtain a strip-shaped PTFE sheet (unstretched; thickness: 0.2 mm) having an adjusted thickness. Subsequently, the obtained PTFE sheet was heated to remove the liquid lubricant.

Next, the PTFE sheet was supplied continuously to a heating furnace held at 300° C. and uniaxially stretched therein in a longitudinal direction (stretching A). The stretching ratio was 3.5. The stretching A was performed by roll stretching, and the strain rate was 1.78 per minute.

Next, the sheet having undergone the stretching A was sintered by allowing the sheet to pass through a heating furnace held at 375° C. without stretching the sheet (sintering B). The time required to pass through the heating furnace was 17 seconds.

Next, the sheet having undergone the sintering B was uniaxially stretched in a width direction in a heating furnace held at 330° C. (stretching C). The stretching ratio was 10. The stretching C was performed by tenter stretching. An area stretching ratio was 35 in Example 1. Next, the sheet having undergone the stretching C was heat-set by allowing the sheet to pass through a heating furnace held at 380° C. without stretching the sheet to obtain a stretched porous PTFE membrane.

Examples 2 to 4

Stretched porous PTFE membranes of Examples 2 to 4 were obtained in the same manner as in Example 1, except that the conditions for the stretching A, the sintering B, the stretching C, and the heat-setting were as shown in Table 1 below. Table 1 also shows the conditions in Example 1.

TABLE 1

| | | Example 1 | Example 2 | Example 3 | Example 4 |
|---|---|---|---|---|---|
| Thickness of unstretched PTFE sheet (mm) | | 0.2 | 0.2 | 0.2 | 0.2 |
| Stretching A | Temperature (° C.) | 300 | 300 | 300 | 240 |
| | Ratio | 3.5 | 4.5 | 4.5 | 3.5 |
| | Strain rate (/min) | 1.78 | 1.94 | 1.94 | 1.78 |
| Sintering B | Temperature (° C.) | 375 | 375 | 375 | 375 |
| | Time (sec) | 17 | 17 | 17 | 17 |
| Stretching C | Temperature (° C.) | 330 | 330 | 330 | 330 |
| | Ratio | 10 | 10 | 8 | 8 |
| Area stretching ratio | | 35 | 45 | 36 | 28 |
| Heat-setting | Temperature (° C.) | 380 | 380 | 380 | 380 |

Comparative Example 1

An unstretched PTFE sheet prepared in the same manner as in Example 1 was supplied continuously to a heating furnace held at 375° C. and uniaxially stretched therein in a longitudinal direction (stretching D). The stretching ratio was 4.5. The stretching D was performed by roll stretching, and the strain rate was 1.94 per minute.

Next, the sheet having undergone the stretching D but not having undergone sintering was uniaxially stretched in a width direction in a heating furnace held at 330° C. (stretching G). The stretching ratio was 10. The stretching G was performed by tenter stretching. An area stretching ratio was 45 in Comparative Example 1. Next, the sheet having undergone the stretching G was heat-set by allowing the sheet to pass through a heating furnace held at 380° C. without stretching the sheet to obtain a stretched porous PTFE membrane. Table 2 below collectively shows the conditions in Comparative Example 2.

Comparative Example 2

A stretched porous PTFE membrane of Comparative Example 2 was obtained in the same manner as in Comparative Example 1, except that a fine PTFE powder having an SSG of 2.19 was used and that the conditions for the stretching D, the stretching G, and the heat-setting were as shown in Table 2 below.

TABLE 2

| | | Comparative Example 1 | Comparative Example 2 |
|---|---|---|---|
| Thickness of unstretched PTFE sheet (mm) | | 0.2 | 0.2 |
| Stretching D | Temperature (° C.) | 375 | 375 |
| | Ratio | 4.5 | 12.0 |
| | Strain rate (/min) | 1.94 | 3.43 |
| Sintering | Temperature (° C.) | Sintering was not performed between the | |
| | Time (sec) | stretching D and the stretching G. | |
| Stretching G | Temperature (° C.) | 330 | 300 |
| | Ratio | 10 | 7.5 |
| Area stretching ratio | | 45 | 90 |
| Heat-setting | Temperature (° C.) | 380 | 400 |

FIGS. 11A to 16A show images of surfaces of the stretched porous PTFE membranes observed using a SEM. FIGS. 11B to 16B show images of cross-sections in the thickness direction of the stretched porous PTFE membranes (cut in the MD direction) observed using a SEM. The SEM images of the cross-sections show substrates for evaluation as well as the stretched porous PTFE membranes, the substrates being used for SEM observation. As shown in FIGS. 11A to 16B, unlike the membranes of Comparative Examples, a node that is long not only in the in-plane direction but also in the thickness direction of the membrane was formed in the stretched porous PTFE membranes of Examples.

Tables 3 and 4 below show the evaluation results for the stretched porous PTFE membranes.

TABLE 3

| | | Stretched porous membrane | | Node | | | | | |
|---|---|---|---|---|---|---|---|---|---|
| | | Thickness (μm) | Mass per unit area (g/m$^2$) | Average length $L_M$ (μm) in thickness direction | Ratio R (%) | Number N per μm thickness | Volume fraction (%) | Average of angles α (degrees) | Average thickness (μm) |
| Example | 1 | 70 | 12.1 | 11.2 | 16 | 1.30 | 10.5 | 71 | 1.8 |
| | 2 | 67 | 7.5 | 12.0 | 18 | 1.08 | 7.8 | 73 | 2.1 |
| | 3 | 68 | 8.7 | 10.9 | 16 | 0.82 | 7.5 | 71 | 1.9 |
| | 4 | 63 | 11.0 | 9.7 | 15 | 1.65 | 10.3 | 71 | 1.8 |
| Comparative | 1 | 64 | 5.6 | 6 | 9 | 5.27 | 8.1 | 68 | 1.9 |
| Example | 2 | 34 | 7.4 | 3 | 9 | 95.2 | 4 | 56 | 1.5 |

TABLE 4

| | Water entry pressure (kPa) | Air permeability (cm$^3$/(sec•cm$^2$)) | Cohesion MD (N/20 mm) | Cohesion TD (N/20 mm) | Total cohesion (N/20 mm)$^2$ |
|---|---|---|---|---|---|
| Example 1 | 40 | 5.2 | 1.83 | 1.20 | 2.2 |
| Example 2 | 37 | 8.5 | 1.70 | 1.15 | 1.9 |
| Example 3 | 40 | 6.8 | 1.88 | 1.49 | 2.8 |
| Example 4 | 44 | 4.8 | 1.87 | 1.37 | 2.6 |
| Comparative Example 1 | 45 | 6.2 | 1.26 | 0.86 | 1.1 |
| Comparative Example 2 | 50 | 5.2 | 0.74 | 0.90 | 0.7 |

As shown in Table 3, the average length $L_M$ of the nodes of the stretched porous PTFE membrane of each Example is greater than that of the membrane of each Comparative Example. The number N of the nodes of the stretched porous PTFE membrane of each Example is smaller than that of the membrane of each Comparative Example. The average of the node angles α of the stretched porous PTFE membrane of each Example is greater than that of the membrane of each Comparative Example. In other words, the nodes of the stretched porous PTFE membranes of Examples are more parallel to the thickness direction of the membranes. Meanwhile, the volume fraction and the thickness of the node do not greatly differ between Examples and Comparative Example 1. As shown in Table 4, the stretched porous PTFE membranes of Examples achieve both the air permeability in the thickness direction and the total cohesion at high levels, compared to the membranes of Comparative Examples.

Figure 17:
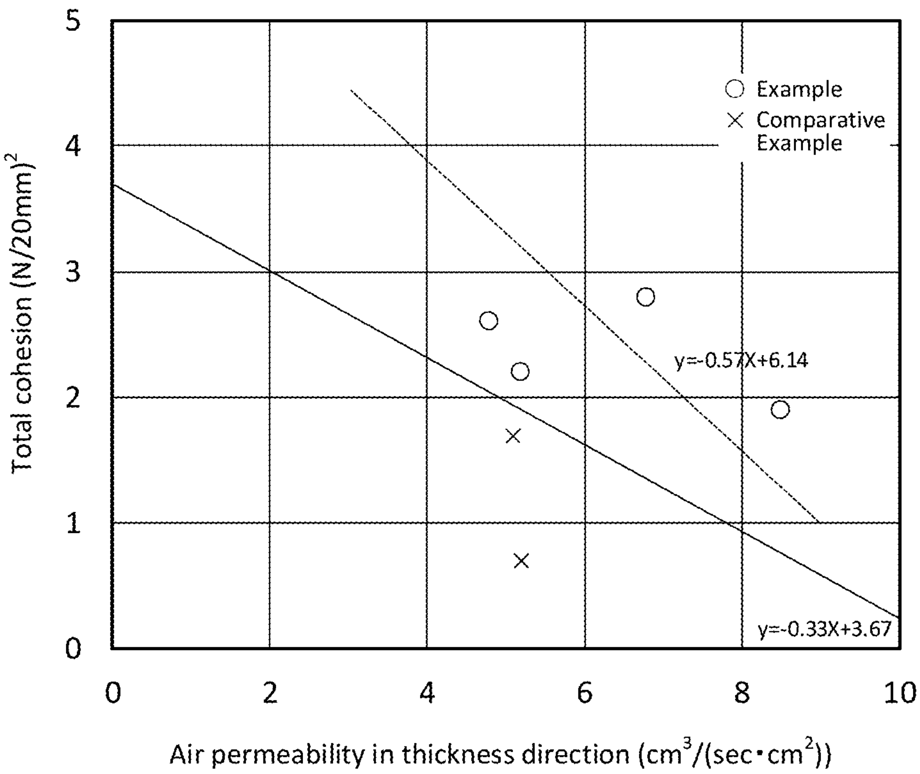
FIG. 17 is a graph showing a relation between an air permeability in a thickness direction and a total cohesion for stretched porous PTFE membranes of Examples and Comparative Examples.

FIG. 17 shows a relation between the air permeability in the thickness direction and the total cohesion for the stretched porous PTFE membranes of Examples and Comparative Examples. As shown in FIG. 17, the stretched porous PTFE membranes of Examples have higher air permeabilities and higher total cohesions than those of Comparative Examples. Additionally, the stretched porous PTFE membranes of Examples satisfy the inequality $C_T \geq -0.33 \times P_T + 3.67$, where $P_T$ represents the air permeability in the thickness direction and Cr represents the total cohesion. The stretched porous PTFE membranes of Examples 2 and 3 satisfy the inequality $C_T \geq -0.57 \times P_T + 6.14$.

INDUSTRIAL APPLICABILITY

The stretched porous PTFE membrane of the present invention can be used, for example, as an air-permeable medium.

The invention claimed is:

1. A stretched porous polytetrafluoroethylene membrane,
the stretched porous polytetrafluoroethylene membrane having a node-fibril structure including a plurality of nodes and a fibril connecting the plurality of nodes, wherein
a ratio of an average length of the plurality of nodes in a thickness direction of the stretched porous polytetrafluoroethylene membrane to a thickness of the stretched porous polytetrafluoroethylene membrane is 10% or more, and wherein
an average of node angles a of the plurality of nodes in the stretched porous polytetrafluoroethylene membrane is 60° or more and 80° or less.

2. The stretched porous polytetrafluoroethylene membrane according to claim 1, wherein there is a cuboid region having an upper surface and a lower surface respectively positioned at one membrane surface and the other membrane surface of the stretched porous polytetrafluoroethylene membrane, wherein the number of the nodes included in the cuboid region is 4 or less per micrometer thickness, and wherein the upper surface and the lower surface each have dimensions of 280 μm×280 μm.

3. The stretched porous polytetrafluoroethylene membrane according to claim 1, wherein an average thickness of the nodes in the stretched porous polytetrafluoroethylene membrane is 0.5 to 5 μm.

4. The stretched porous polytetrafluoroethylene membrane according to claim 1, having an air permeability of 4 $cm^3/(sec \cdot cm^2)$ or more, as expressed in terms of Frazier air permeability, in the thickness direction.

5. The stretched porous polytetrafluoroethylene membrane according to claim 1, having a total cohesion of 1.9 $(N/20\ mm)^2$ or more, the total cohesion being expressed by a product of a peel cohesion in a first in-plane direction and a peel cohesion in a second in-plane direction perpendicular to the first direction.

6. The stretched porous polytetrafluoroethylene membrane according to claim 1, having a mass per unit area of 7.0 $g/m^2$ or more.

7. The stretched porous polytetrafluoroethylene membrane according to claim 1, having a thickness of 30 μm or more.

8. An air-permeable medium,
the air-permeable medium
having air permeability in a thickness direction of the air-permeable medium,
preventing a foreign matter from passing therethrough in the thickness direction, and
comprising the stretched porous polytetrafluoroethylene membrane according to claim 1.

9. The air-permeable medium according to claim 8, further comprising an air-permeable supporting member laminated on the stretched porous polytetrafluoroethylene membrane.

10. A filter member,
the filter member comprising
an air-permeable medium having air permeability in a thickness direction of the air-permeable medium and preventing a foreign matter from passing therethrough in the thickness direction, wherein
the air-permeable medium is the air-permeable medium according to claim 8.

* * * * *